United States Patent
Gautier

(10) Patent No.: US 9,303,343 B2
(45) Date of Patent: Apr. 5, 2016

(54) DRIVE DEVICE USING NEEDLES TO DRIVE A HELICAL FIBER SHEET FOR NEEDLING

(71) Applicant: MESSIER-BUGATTI-DOWTY, Vélizy-Villacoublay (FR)

(72) Inventor: Patrice Gautier, Frontonans (FR)

(73) Assignee: MESSIER-BUGATTI-DOWTY, Velizy-Villacoublay (FR)

( * ) Notice: Subject to any disclaimer, the term of this patent is extended or adjusted under 35 U.S.C. 154(b) by 151 days.

(21) Appl. No.: 14/304,326

(22) Filed: Jun. 13, 2014

(65) Prior Publication Data
US 2014/0366343 A1   Dec. 18, 2014

(30) Foreign Application Priority Data

Jun. 13, 2013   (FR) ..................................... 1355507

(51) Int. Cl.
| | |
|---|---|
| *D04H 18/02* | (2012.01) |
| *D04H 1/4242* | (2012.01) |
| *D04H 1/46* | (2012.01) |
| *D04H 1/498* | (2012.01) |
| *F16D 69/02* | (2006.01) |

(52) U.S. Cl.
CPC ............. *D04H 18/02* (2013.01); *D04H 1/4242* (2013.01); *D04H 1/46* (2013.01); *D04H 1/498* (2013.01); *F16D 69/02* (2013.01)

(58) Field of Classification Search
CPC ..... D04H 18/00; D04H 18/02; D04H 1/4242; D04H 1/498; D04H 1/46
USPC ........... 28/107, 115, 108, 109, 110, 112, 113, 28/114
See application file for complete search history.

(56) References Cited

U.S. PATENT DOCUMENTS

| | | | |
|---|---|---|---|
| 5,662,855 A | 9/1997 | Liew et al. | |
| 6,009,605 A * | 1/2000 | Olry | B29B 11/16 28/107 |
| 6,363,593 B1 * | 4/2002 | Duval | D04H 18/02 28/107 |
| 6,367,130 B1 * | 4/2002 | Duval | D04H 18/02 28/107 |
| 2005/0172465 A1 * | 8/2005 | Duval | B29B 11/16 28/101 |
| 2005/0235471 A1 * | 10/2005 | Delecroix | D04H 1/498 28/107 |
| 2007/0090564 A1 * | 4/2007 | Delecroix | D04H 1/4242 264/258 |
| 2011/0154628 A1 * | 6/2011 | Vincent | D04H 18/02 28/107 |

(Continued)

FOREIGN PATENT DOCUMENTS

| | | |
|---|---|---|
| EP | 2 339 055 | 6/2011 |
| EP | 2 341 175 | 7/2011 |

(Continued)

OTHER PUBLICATIONS

French Search Report dated Feb. 3, 2014 for Appln. No. FR1355507.

*Primary Examiner* — Amy Vanatta
(74) *Attorney, Agent, or Firm* — Pillsbury Winthrop Shaw Pittman LLP

(57) ABSTRACT

A drive device for driving a helical fiber sheet for needling, the device including a needling table having a stationary top surface for receiving a helical fiber sheet for needling, a circular turntable positioned under the top surface of the needling table and having a plurality of drive needles vertically mounted thereon, the drive needles passing through the needling table and projecting relative to its top surface, the drive needles being positioned on at least one diameter of the turntable, and a drive system constructed and arranged to drive the turntable in rotation relative to the top surface of the needling table about a vertical axis.

11 Claims, 3 Drawing Sheets

(56) References Cited

U.S. PATENT DOCUMENTS

2011/0154629 A1* 6/2011 Delecroix .............. D04H 18/02
28/108
2011/0275266 A1* 11/2011 Lecostaouec ........... B29B 11/16
442/240
2015/0337468 A1* 11/2015 Le Costaouec .......... D04H 1/48
28/108

FOREIGN PATENT DOCUMENTS

| WO | WO 97/20092 | 6/1997 |
| WO | WO 02/088449 | 11/2002 |
| WO | WO 02/088451 | 11/2002 |
| WO | WO 03/100148 | 12/2003 |
| WO | WO 2005/111292 | 11/2005 |

* cited by examiner

DRIVE DEVICE USING NEEDLES TO DRIVE A HELICAL FIBER SHEET FOR NEEDLING

CROSS-REFERENCE TO RELATED APPLICATIONS

This application claims priority to French Patent Application No. 1355507, filed Jun. 13, 2013, the entire content of which is incorporated herein by reference in its entirety.

FIELD

The present invention relates to the general field of circular needling machines for making needled textile structures from a helical fiber sheet. The invention relates more particularly to the device that is included in such a needling machine for driving the helical fiber sheet.

BACKGROUND

It is known to use a circular needling machine for fabricating annular textile structures that are to constitute the fiber reinforcement of annular parts made of composite material, in particular brake disks, such as disks made of carbon/carbon (C/C) material for airplane brakes.

A circular needling machine generally comprises a needling table having a horizontal top surface onto which a helical fiber sheet for needling is applied. Rollers serve to drive the fiber sheet in rotation about a vertical axis by means of friction. The sheet as put into rotation in this way passes under a needling head that overlies an angular sector of the top surface of the needling table. The needling head is moved with vertical reciprocating motion and carries needles that take fibers from within the stacked layers of the fiber sheet in order to transfer them through the layers and thereby bond together the various layers of the fiber sheet. Reference may be made to Document WO 02/088449, which describes an embodiment of such a needling machine.

That type of needling machine presents a device for driving the fiber sheet by means of friction using conical rollers that are arranged above the needling table. Unfortunately, that type of drive presents a certain number of drawbacks. In particular, it makes it necessary to have recourse to a guide at the outside diameter of the sheet so as to keep the sheet around its axis of rotation while it is being moved. In addition, the guide and the rollers impart stresses to the fiber sheet. Finally, since drive is transmitted by friction, the angular position of the sheet of the needling table is uncertain.

SUMMARY

A main aspect of the present invention is thus to mitigate those drawbacks by proposing a device that enables the fiber sheet to be driven accurately and repeatedly, but without thereby applying excessive levels of stress thereto.

In accordance with an embodiment of the invention, this is achieved by a drive device for driving a helical fiber sheet for needling, the device comprising a needling table having a stationary top surface for receiving a helical fiber sheet for needling, a circular turntable positioned under the top surface of the needling table and having a plurality of drive needles vertically mounted thereon, the drive needles passing through the needling table and projecting relative to its top surface, said drive needles being positioned on at least one diameter of the turntable, and a drive system or arrangement constructed and arranged to drive the turntable in rotation relative to the top surface of the needling table about a vertical axis.

The device of an embodiment of the invention is remarkable in that it drives the fiber sheet around its vertical axis of rotation by means of drive needles. These needles project vertically above the needling table and they are driven in rotation relative to the needling table. Thus, the fiber sheet is driven without slip, thereby making it possible to obtain accurate angular positioning of the sheet on the needling table. In addition, this type of drive does not generate guidance stresses nor does it generate drive stresses on the sheet, and it does not require a guide to be added to the needling table.

Preferably, in an embodiment, the needling table has a needling zone, the device then including a retracting device constructed and arranged to retract the drive needles in the needling zone of the needling table. Retracting the drive needles in this needling zone serves to avoid any interference between the drive needles and the fiber transfer needles.

To this end, each drive needle may be slidably mounted in a vertical sheath secured to the circular turntable, the device further including a lowering plunger suitable for lowering the drive needle into its sheath on approaching the needling zone, and a raising plunger suitable for raising the drive needle on leaving the needling zone.

Under such circumstances, the device may have a sensor for detecting the presence of a drive needle approaching or leaving the needling zone in order to actuate the lowering and raising plungers. Each sheath may include a blocking device constructed and arranged to block the drive needle in the raised position.

The top surface of the needling table may include at least one circular slot for allowing the drive needles to pass.

Preferably, in an embodiment, the drive needles are positioned on two concentric diameters of the turntable. These diameters correspond substantially to the outside and inside diameters of the fiber sheet to be needled.

Under such circumstances, the drive needles may be secured to needle carriers (which may be twelve in number) mounted on the turntable, each needle carrier supporting two drive needles, each positioned on a different diameter of the turntable.

Beneficially, the drive system constructed and arranged to drive the turntable in rotation comprise a stepper motor coupled to a vertical rotary shaft of the turntable. This type of motor makes it possible to cause the sheet to advance discontinuously with the sheet being stopped on each occasion the needling table moves down.

An embodiment of the invention also provides a circular needling machine for needling a textile structure made from a helical fiber sheet, the machine including a drive device as defined above.

BRIEF DESCRIPTION OF THE DRAWINGS

Other characteristics and benefits of the present invention appear from the following description given with reference to the accompanying drawings, which show an embodiment having no limiting character. In the figures.

DETAILED DESCRIPTION

Figure 1:
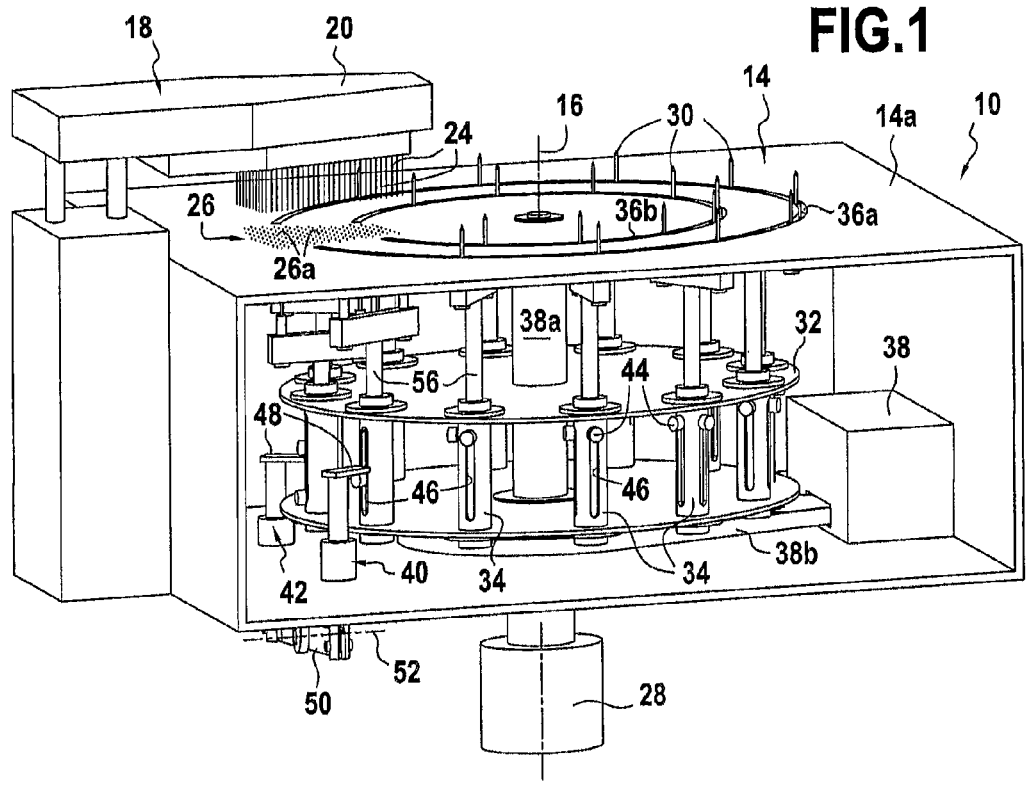
FIGS. 1 and 2 are perspective views of a drive device of an embodiment of the invention.
Figure 2:
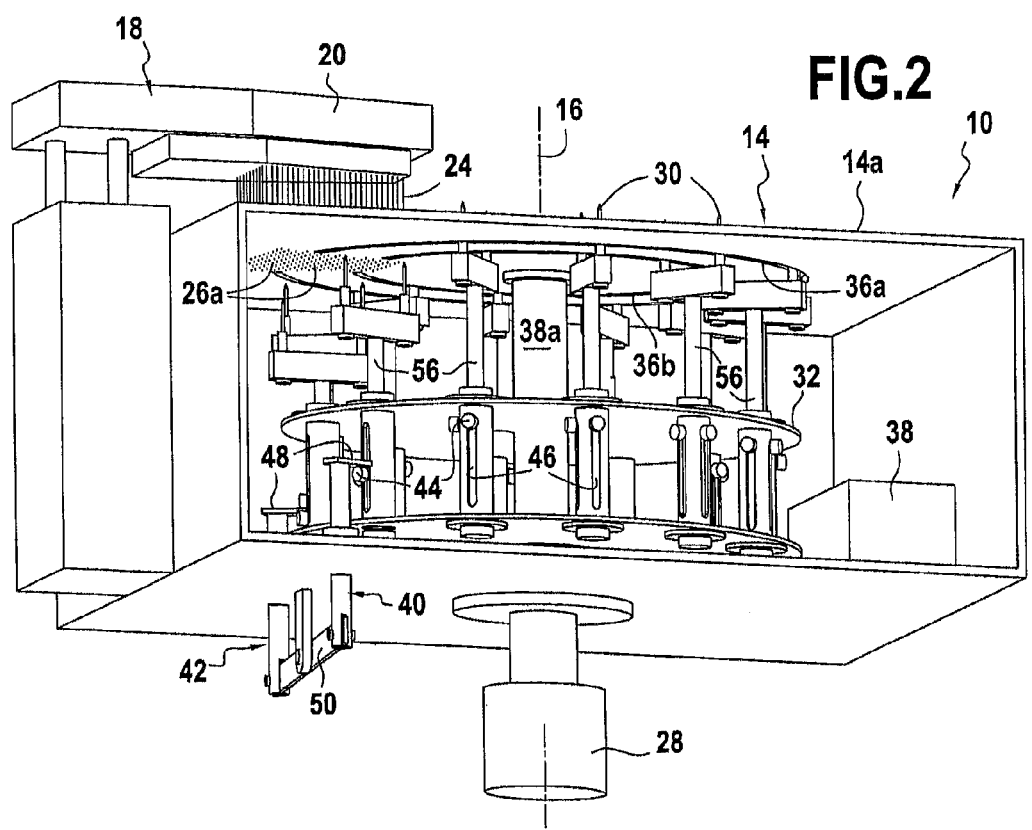

FIGS. 1 to 5 show a drive device 10 in accordance with an embodiment of the invention forming part of a circular needling machine for making needled textile structures from a helical fiber sheet.

The invention applies to any circular needling process in which layers (or plies) of a fiber sheet are stacked and needled together on a turntable in order to form a needled fiber preform of annular shape.

These layers may be formed beforehand as rings or juxtaposed ring sectors that are cut out from a woven fabric or a non-woven material made of unidirectional or multidirectional fibers. They may also be made from turns that are wound flat from a feed device such as that described in patent application WO 02/088449 or from turns made from deformed braids, or indeed from turns made from a deformable two-dimensional texture (a helical braid or woven fabric).

Superposed layers 12 of helical fiber sheet for needling (FIGS. 4A-4B and 5) rest directly on the stationary horizontal top surface 14a of a needling table 14 of a needling machine. These layers of fiber sheet for needling are driven in rotation about a vertical axis 16 by means of a drive device that is described below.

In known manner, the fiber sheet 12 that is rotated passes a needling device 18 having in particular a needling head 20 that is arranged over a predetermined angular sector of the top surface 14a of the needling table 14. This needling head is moved with reciprocating vertical motion relative to the needling head by means of an actuator system 22 (e.g. of the crank-rod type, see FIG. 5).

The needling head 20 carries a determined number of fiber transfer needles 24 that are provided with barbs, hooks, or forks for taking fibers from the stacked layers of the fiber sheet and transferring them through the stacked layers when they penetrate into the preform. For this purpose, the top surface 14a of the needling table has a needling zone 26 formed with a series of vertical perforations 26a located in register with the fiber transfer needles 24 of the needling head in order to pass them while needling the initial layers of the fiber sheet 12.

Furthermore, each time a new ply is needled, the top surface 14a of the needling table is moved vertically by appropriate drive system 28 through a downward step of determined size corresponding to the thickness of a needled layer.

In the embodiment of the invention, rotary drive of the fiber sheet 12 about the vertical axis 16 is provided by means of drive needles 30 moving with circular motion under the fiber sheet.

For this purpose, the needling table 14 comprises a circular turntable 32 positioned under its top surface 14a and having a plurality of drive needles 30 vertically mounted thereon that pass through the needling table and project from its top surface, the circular turntable itself performing rotary motion about its vertical axis of symmetry (coinciding with the vertical axis 16).

More precisely, each drive needle 30 is slidably mounted in a vertical sheath 34 secured to the turntable 32. These drive needles pass through circular slots 36a, 36b formed in the top surface 14a of the needling table and they point upwards.

In the embodiment shown in the figures, provision is made for the drive needles 30 to be distributed in two concentric circular slots 36a and 36b corresponding to two concentric diameters of the turntable 32. The diameter of the outer slot 36a is slightly smaller than the outside diameter of the fiber sheet for needling, and the diameter of the inner slot 36b is slightly greater than the inside diameter of the fiber sheet.

The turntable 32 carrying the drive needles 30 is set into rotation by means of a motor 38 coupled to a vertical rotary shaft 38a. By way of example, it may be an electric stepper motor (visible in particular in FIGS. 3, 4A, and 4B) coupled to the shaft 38a by a transmission belt 38b. This type of motor serves to advance the sheet discontinuously with a stop each time the needling table moves down.

Furthermore, the drive needles 30 project from the top surface 14a of the needling table 14 by a height that corresponds to at least twice the thickness of a layer of the fiber sheet to be needled. Thus, the first two layers of the fiber sheet that are placed on the needling table are penetrated by the drive needles and are driven in rotation thereby around the vertical axis 16.

Given the presence of the needling zone 26 formed in the top surface 14a of the needling table in register with the fiber transfer needles of the needling head, it is desirable to retract the drive needles 30 in this needling zone.

For this purpose, the drive device 10 also has a lowering plunger 40 suitable for lowering the drive needles 30 in its sheath 34 on approaching the needling zone 26 so that it no longer projects above the top surface 14a of the needling table, and a raising plunger 42 suitable for raising the device needle when it leaves the needling zone.

Figure 4A:
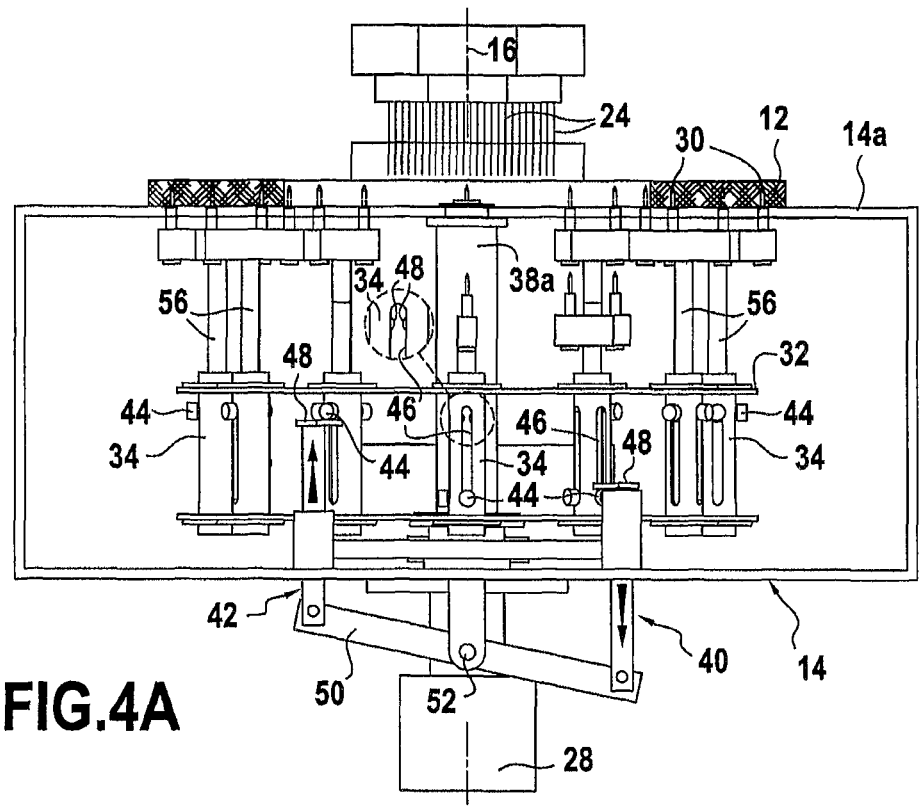
FIGS. 4A and 4B are side views showing the operation of the drive device of FIGS. 1 to 3.
Figure 4B:
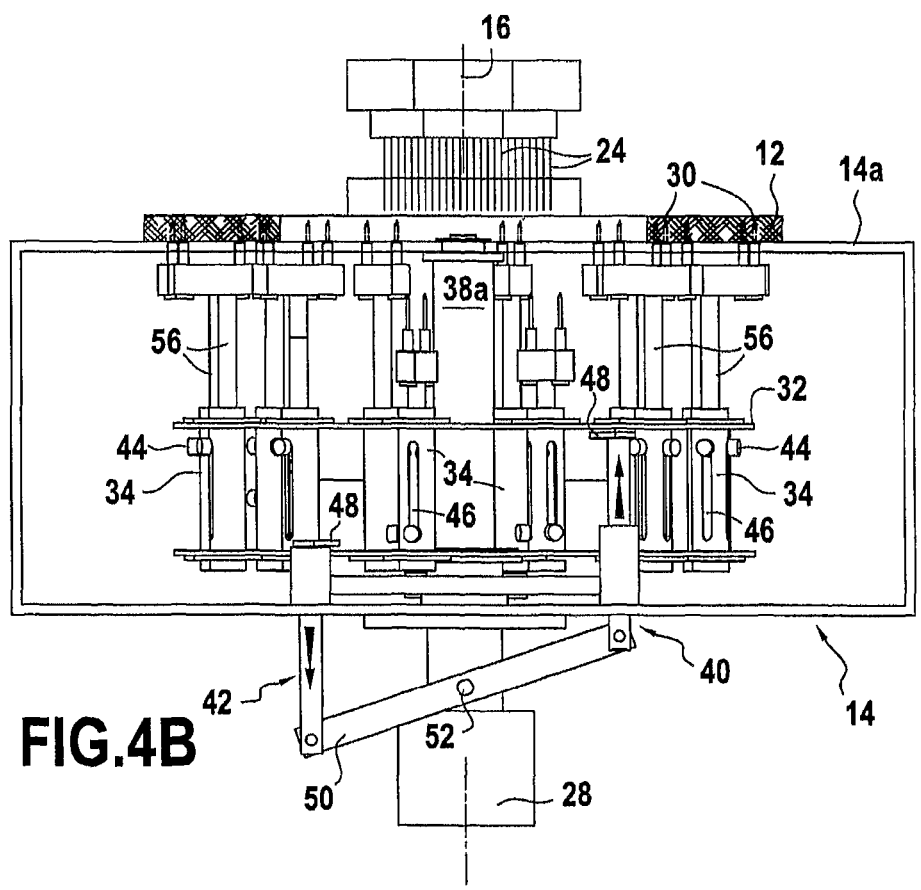

More precisely, as shown in FIGS. 4A and 4B, each drive needle 30 may be slid inside its sheath 34 between a low position and a high position by means of a stud 44 that projects laterally from the sheath and that is secured to the drive needle. Under the action of the lowering and raising plungers 40 and 42, this stud is moved along a vertical slot 46 formed in the sheath 34 between the low position and the high position. The stud 44 is held in the high position, e.g. by means of spring blades 48 arranged inside the sheath in its top portion (see enlargement in FIG. 4A).

The lowering plunger 40 is positioned inside the needling table level with the angular end of the needling zone 26 that corresponds to the drive needles 30 entering into this zone. Likewise, the raising plunger 42 is positioned at the other angular end of the needling zone 26 corresponding to the drive needles 30 exiting this zone.

The lowering and raising plungers 40 and 42 are rods that are vertically movable and that have top ends provided with respective tabs 48 for co-operating with the stud 44 of the drive needle 30 that is presented in register therewith in order to lower it or to raise it.

In the embodiment, these plungers 40, 42 are preferably connected to each other so that lowering the lowering plunger 40 causes the raising plunger 42 to rise (and vice versa). For example, the bottom ends of these plungers may be connected together by a rocker bar 50 that is mounted to pivot about a horizontal axis 52 passing through a midplane of the bar 50.

The plungers 40 and 42 are rocked with the help of a motor (not shown in the figures) coupled to a sensor 54 (FIG. 3) for detecting the presence of a drive needle 30 approaching or leaving the needling zone 26.

Figure 3:
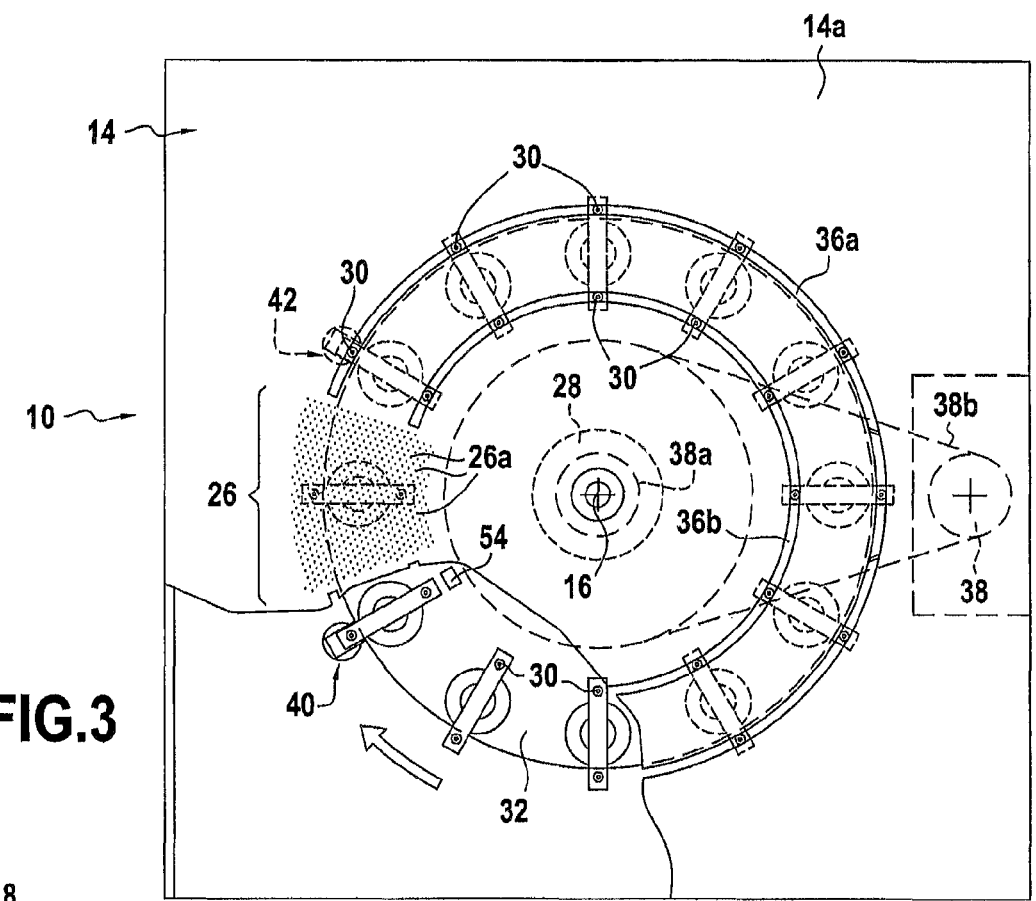
FIG. 3 is a plan view of the drive device of FIGS. 1 and 2.
Figure 5:
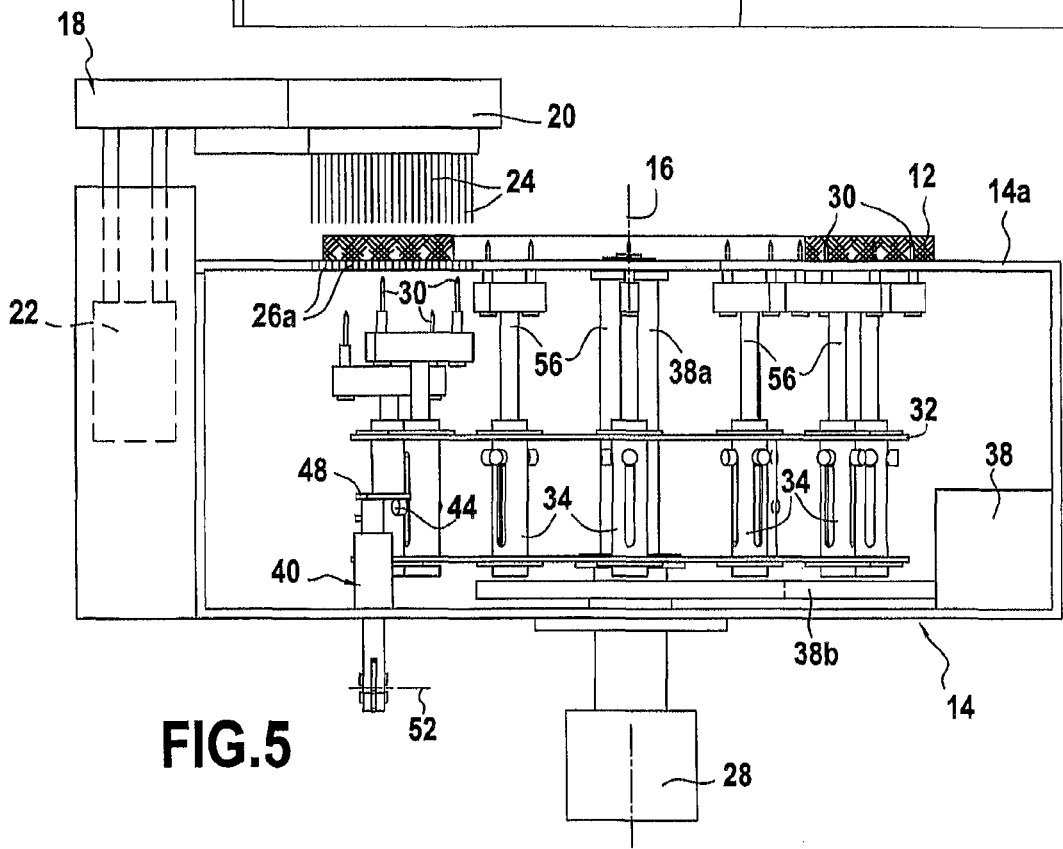
FIG. 5 is another side view of the drive device of an embodiment the invention.

For example, as shown in FIG. 3, such a sensor 54 may be positioned in the vicinity of the lowering plunger 40. Under such circumstances, when a drive needle 30 goes past this sensor 54, it activates the plungers 40, 42 causing the drive needle in question to be lowered and simultaneously causing the drive needle situated facing the raising plunger 42 at the outlet from the needling zone 26 to be raised (FIG. 4A). Once the drive needle has been lowered in its sheath, the plungers 40 and 42 are activated once again to raise the lowering plunger and to lower the raising plunger before the arrival of the following drive needle (FIG. 4B).

It will be appreciated that it is possible to envisage a configuration in which the present sensor is positioned in the vicinity of the lowering plunger. Under such circumstances, it is the passage of a drive needle past this sensor at the exit from the needling zone that causes the plungers to be rocked. Likewise, it is possible to envisage a system in which the raising and lowering plungers are activated independently of each other, each plunger being associated with a respective presence sensor for causing it to move.

In a particular configuration of the drive device, the drive needles 30 are secured to needle carriers 56 mounted on the turntable 32, each needle carrier supporting two drive device needles 30, each positioned at a different diameter of the turntable.

In other words, each needle carrier 56 carries two drive needles, one moving in the outer slot 36a formed in the top surface 14a of the needling table, and the other moving in the inner slot 36b.

In another particular configuration of the drive device, it has twelve needle carriers 56 that are regularly distributed around the vertical axis of rotation 16 of the fiber sheet.

It will be appreciated that this number could be varied, in particular depending on the intended application and on the dimensions of the fiber sheet for needling.

Such a drive device may operate as follows. The end of a first layer of fiber sheet for needling is positioned on the needling table, being attached to at least four drive needles. The drive needles are then caused to rotate so as to cause the fiber sheet to perform one complete revolution without needling. Needling is then started at reduced speed for the first two layers, and then the needling table is lowered by one step. The N following layers are then needled at normal speed with the needling table being lowered at the end of each revolution.

The invention claimed is:

1. A drive device for driving a helical fiber sheet for needling, the device comprising:
   a needling table having a stationary top surface for receiving a helical fiber sheet for needling;
   a circular turntable positioned under the top surface of the needling table and having a plurality of drive needles vertically mounted thereon, the drive needles passing through the needling table and projecting relative to its top surface, said drive needles being positioned on at least one diameter of the turntable; and
   a drive system constructed and arranged to drive the turntable in rotation relative to the top surface of the needling table about a vertical axis.

2. The device according to claim 1, wherein the needling table has a needling zone, the device further including a retracting device constructed and arranged to retract the drive needles in the needling zone of the needling table.

3. The device according to claim 2, wherein each drive needle is slidably mounted in a vertical sheath secured to the circular turntable, the device further including a lowering plunger suitable for lowering the drive needle into its sheath on approaching the needling zone, and a raising plunger suitable for raising the drive needle on leaving the needling zone.

4. The device according to claim 3, having a sensor for detecting the presence of a drive needle approaching or leaving the needling zone in order to actuate the lowering and raising plungers.

5. The device according to claim 3, wherein each sheath includes a blocking device constructed and arranged to block the drive needle in the raised position.

6. The device according to claim 1, wherein the top surface of the needling table includes at least one circular slot for allowing the drive needles to pass.

7. The device according to claim 1, wherein the drive needles are positioned on two concentric diameters of the turntable.

8. The device according to claim 7, wherein the drive needles are secured to needle carriers mounted on the turntable, each needle carrier supporting two drive needles, each positioned on a different diameter of the turntable.

9. The device according to claim 8, having twelve needle carriers.

10. The device according to claim 1, wherein the drive system constructed and arranged to drive the turntable in rotation comprise a stepper motor coupled to a vertical rotary shaft of the turntable.

11. A circular needling machine for needling a textile structure made from a helical fiber sheet, the machine including a drive device according to claim 1.

* * * * *